Patented Jan. 14, 1941

2,228,288

UNITED STATES PATENT OFFICE 2,228,288

DIAZOTIZABLE AZO DYESTUFFS

Fritz Suckfüll, Leverkusen-Wiesdorf, and Heinrich Clingestein, Cologne-on-the-Rhine, Germany, assignors to General Aniline & Film Corporation, a corporation of Delaware No Drawing. Application January 12, 1938, Serial No. 184,568. In Germany February 26, 1937

15 Claims. (Cl. 8—46)

The present invention relates to new diazotizable azo dyestuffs, to a method of preparing the same, to a process of dyeing and to dyed fibers; more particularly it relates to diazotizable azo dyestuffs which may be represented by the general formula:

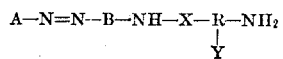

In this formula A—N=N— stands for the radical of a diazo compound suitable for the formation of yellow azo dyestuffs, which may contain one or several azo groups, B stands for the radical of 1-aryl-5-pyrazolone, X means the radicals —CO— or —SO$_2$—, R stands for an aromatic radical and Y for hydrogen or a negativating substituent.

Our new dyestuffs are obtainable by causing yellow pyrazolone dyestuffs of the general formula:

wherein A—N=N— stands for the radical of a diazo compound suitable for the formation of yellow azo dyestuffs, which may also contain azo groups, and B′ stands for the radical of a 1-aminoaryl-5-pyrazolone, to react with acid halides of organic sulfonic or carboxylic acids, which contain in an aromatic nucleus a substituent being convertible into an amino group such as a nitro group or an acyl amino group, followed by conversion of the said substituent into the amino group, e. g. by reduction or saponification.

Besides the above described method our new dyestuffs can also be prepared by first condensing 1-aminoaryl-5-pyrazolones with the above mentioned acid halides of organic sulfonic or carboxylic acids, then coupling with a diazo compound, which may contain azo groups, and finally converting the said convertible substituent into the amino group; the last two operations after the condensation can also be carried out in a reverse order, i. e. first converting the convertible substituent into the amino group and then coupling with a diazo compound.

The 1-aminoaryl-5-pyrazolones used in the above described process and its modification are 5-pyrazolones which bear in the 1-position aminoaryl radicals, the aryl nuclei of which may carry further substituents, and which bear in the 3-position one of the substituents usually introduced into pyrazolones; such substituents in the 3-position are e. g. alkyl, aryl, the substitution products of these radicals, further the —COOH— group and its derivatives.

As suitable acid halides for our process may be mentioned by way of example nitrobenzoyl halides, nitrobenzenesulfo halides, nitrophenylacetyl halides, acid halides of nitrobenzophenones and further the nuclear substitution products of the said compounds, preferably such with negativating substituents, such as —NO$_2$,— —CO—, —SO$_2$—, —C≡N, or halogen; the divalent substituents, such as —CO— and —SO$_2$— have one bond attached to the nucleus which bears the group convertible into the amino group, while the other bond may carry any radical.

Compared with the known dyestuffs, which contain as terminal components aminoarylpyrazolone or its derivatives, the new dyestuffs are distinguished by yielding on the fiber after diazotization and developing with β-naphthol, essentially yellower shades. The diazotizable dyestuffs used until now for yellow shades had to be developed with pyrazolones in order to obtain the yellow shade, for, when developed with β-naphthol, these dyestuffs yield red to orange shades. The technical advantage of the present dyestuffs becomes chiefly evident in shading, as in the dyeing practice mostly not the pure diazotizable dyestuffs but mixtures of the same are used, in order to obtain different shades in different directions, such as fashion-shades and so on. Although most of the diazotizable dyestuffs are developed with β-naphthol a yellow-shading was not possible with dyestuffs of the "β-naphthol series" up to the present. The known yellow diazotizable dyestuffs had, without exception, to be developed with pyrazolone as already mentioned above, and therefore they were not suitable for shading in the "β-naphthol series." Only such a diazotizable dyestuff can be suitable for this purpose which yields developed with β-naphthol yellow shades, since it is practically not possible to develop either successively or simultaneously with β-naphthol and pyrazolone. In some cases it was possible to shade with orange instead of yellow, however, the reddish tinge shown by the dyeings thus produced, mostly proved very undesirable. Owing to this quite a number of shades wanted could not be obtained. In the dyeing practice therefore the ardent want existed for diazotizable dyestuffs which can be developed to yellower shades with β-naphthol and with which yellow-shading can be carried out without difficulties. For the first time diazotizable dyestuffs of this kind are disclosed by the present invention, they meet a long felt want and therefore represent a remarkable and important advance in the art.

The following examples illustrate the invention without being restricted thereto the parts being by weight:

*Example 1*

65 parts of the disazodyestuff described in British Patent No. 451,000, Example 2, paragraph 2, of the following constitution:

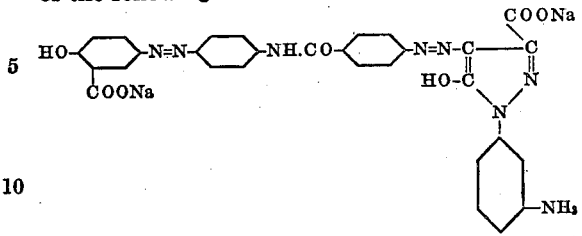

are suspended in 2500 parts of water and caused to react with m-nitrobenzoyl chloride at 60–65° C. in the presence of an acid-binding agent, until a sample can no longer be diazotized. The dyestuff is isolated by adding salt, again suspended in about 2000 parts of water and treated at 80° C. for about one hour with an aqueous solution of 42 parts of crystallized sodium sulfide. When reduction is complete the dyestuff is separated by adding sodium chloride, isolated and dried. It corresponds to the following formula:

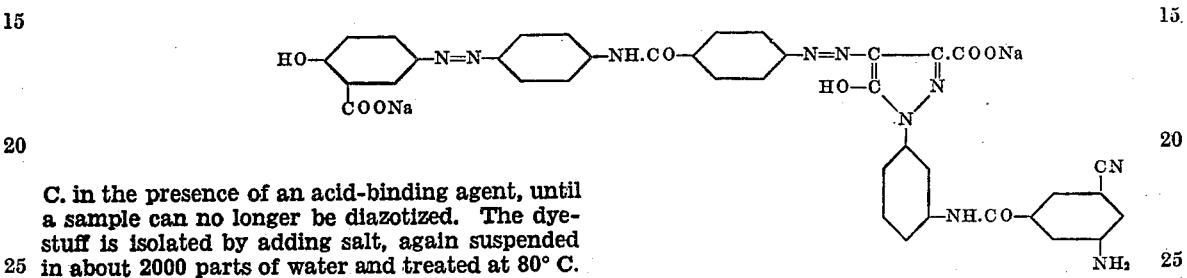

and dyes cotton after diazotization and developing with β-naphthol, essentially yellower shades than the dyestuff which has not been condensed with m-nitrobenzoyl chloride.

Example 2

65 parts of the diazo dyestuff used in Example 1 are condensed with 5-nitro-2.4-dichlorobenzoyl chloride, in aqueous solution as described above, until a sample can no longer be diazotized. The separated dyestuff is reduced as described, with 42 parts of crystallized sodium sulfide, separated by sodium chloride, isolated and dried. It corresponds to the following formula:

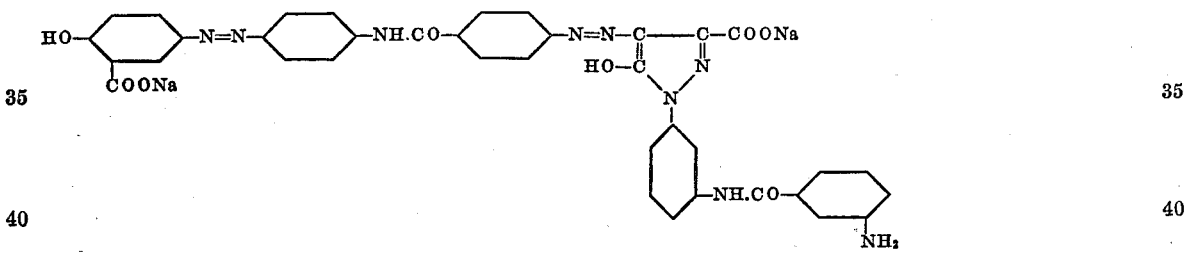

and dyes cotton, after diazotization and developing with β-naphthol somewhat yellower shades than the aminobenzoyl dyestuff obtained according to Example 1.

Example 3

If the condensation of the dyestuff described in Example 1 is carried out with 3-nitro-5-cyanobenzoyl chloride, yellower shades are obtained on developing the reduced dyestuff of the formula:

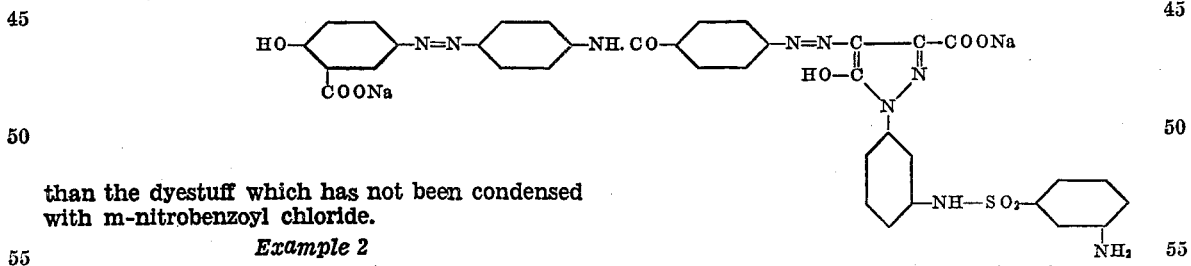

with β-naphthol than with the dyestuff which has not been condensed.

Example 4

On replacing in Example 1 the m-nitrobenzoyl chloride by the m-nitrobenzene sulfochloride, a dyestuff of the formula:

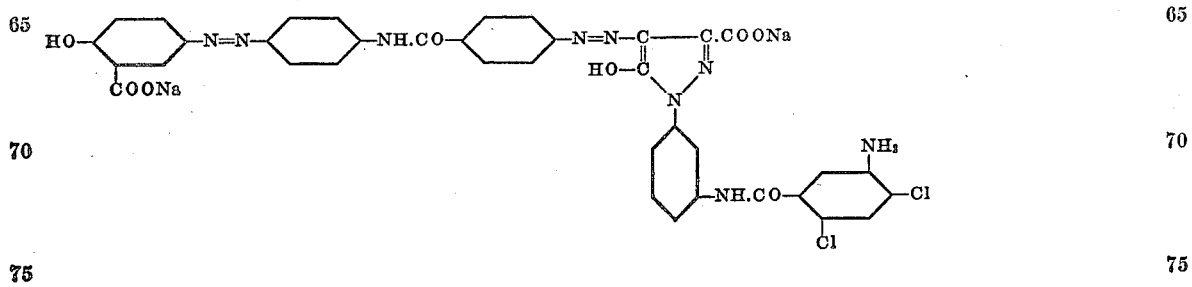

is obtained, which after dyeing, diazotizing and developing with β-naphthol, yields yellower shades than the one obtained by the use of m-nitrobenzoyl chloride.

Example 5

219 parts of 1-(3'-aminophenyl)-5-pyrazolone-3-carboxylic acid are dissolved in 800 parts of dry pyridine and 263 parts of the chloride of the 2- nitro-4-carboxyphenyl-methylsulfone of the formula:

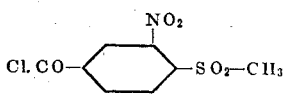

are added at ordinary temperature whereby a considerable rise of temperature is observed. By heating to 100° C. the reaction is completed; after cooling, water and ice are added and the condensation product is separated. By dissolving in water and precipitating again, that part which can still be diazotized is separated.

44.6 parts of the condensation product thus obtained are dissolved in water, mixed with 30 parts of sodium carbonate and combined with the diazo compound prepared from 65 parts of the compound:

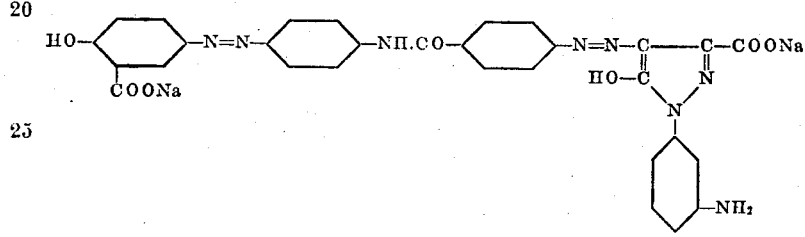

which can be obtained according to British Patent No. 451,100. When coupling is complete, the dyestuff is heated to 80° C. and reduced with an aqueous solution of 42 parts of crystallized sodium sulfide. When the reduction is complete the dyestuff is separated by adding salt, pressed and dried. It corresponds to the formula:

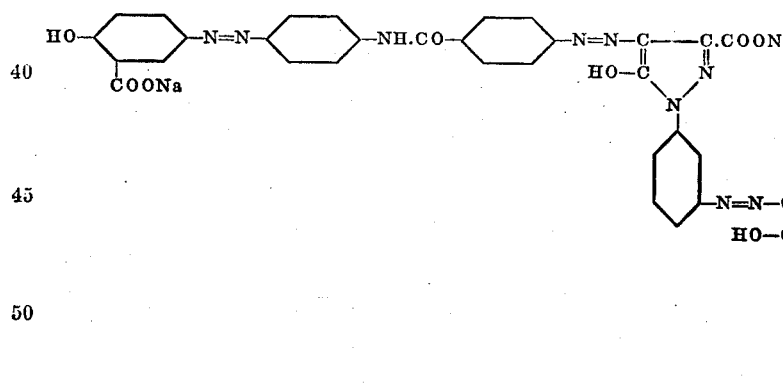

and dyes cotton after diazotization and developing with β-naphthol yellow shades, while the corresponding dyestuff, containing as terminal component uncondensed aminophenylpyrazolone carboxylic acid, yields on cotton orange shades.

The reduction of the nitro group can also be carried out before coupling. The reduced condensation product is separated by addition of acid, again dissolved in water and then coupled.

The condensation of the aminoarylpyrazolone can also be carried out in water, preferably at a somewhat higher temperature for instance at 80–90° C.

These condensation products obtained in different ways lead to identical dyestuffs.

*Example 6*

44.6 parts of the condensation product, obtained according to Example 5, of the formula:

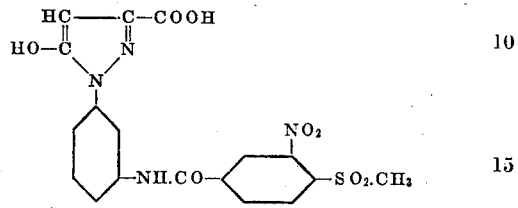

are dissolved in water and combined, in the presence of 30 parts of sodium carbonate, with the

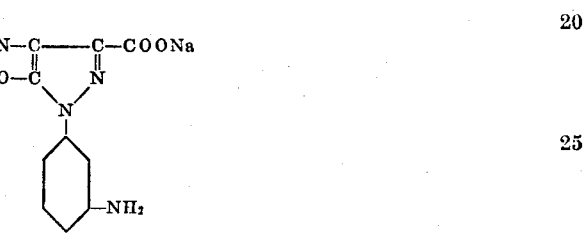

diazo compound prepared from 39.8 parts of the amino azo dyestuff of the formula:

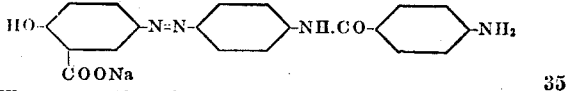

When coupling is complete the dyestuff is reduced as described. It corresponds to the formula:

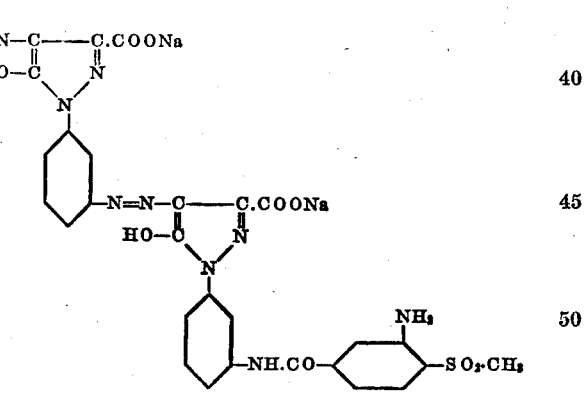

and dyes cotton after diazotization and developing with β-naphthol yellow shades, while the corresponding dyestuff containing as terminal component uncondensed aminophenylpyrazolone-carboxylic acid, yields on cotton red orange shades.

*Example 7*

219 parts of 1-(3'-aminophenyl)-5-pyrazolone- 3-carboxylic acid are dissolved in 3000 parts of water with the addition of sodium carbonate to a neutral solution and treated with m-nitrobenzoyl-chloride at 65–70° C. the reaction always being kept weakly alkaline by the addition of an acid-binding agent until the amino group can no longer be detected by diazotization. When the reaction is complete, the mixture is made distinctly alkaline, heated for a short while and after cooling the product is isolated by adding acid.

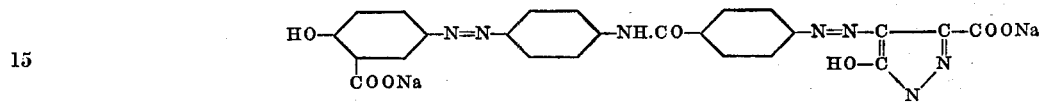

36.8 parts of the intermediate thus obtained are coupled, in the presence of 30 parts of sodium carbonate with the diazo compound prepared from 65 parts of the compound:

and, as described, reduced with 42 parts of crystallized sodium sulfide. The isolated dyestuff which corresponds to the formula:

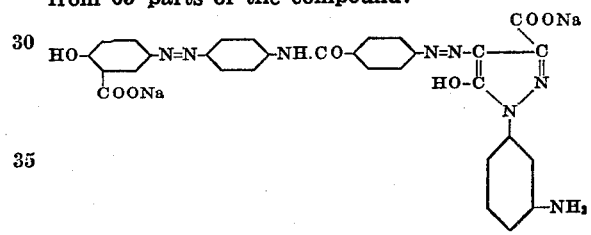

dyes cotton after diazotization and developing with β-naphthol yellower shades than the corresponding dyestuff with uncondensed aminophenylpyrazolone-carboxylic acid.

If 36.8 parts of the condensation product obtained according to Example 7, paragraph 1, are coupled in the presence of 30 parts of sodium carbonate with the diazo compound prepared from 39.8 parts of the amino azodyestuff of the constitution:

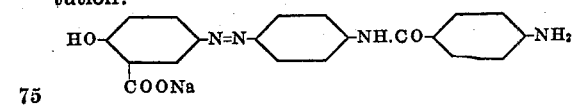

after the reduction a dyestuff is obtained which is identical with that obtainable according to Example 1.

*Example 8*

On replacing the m-nitrobenzoyl chloride used in Example 1 by 3.5-dinitrobenzoyl chloride and treating the dinitrobenzoate obtained with 42 parts of crystallized sodium sulfide until one nitro group is reduced to the amino group a dyestuff of the formula:

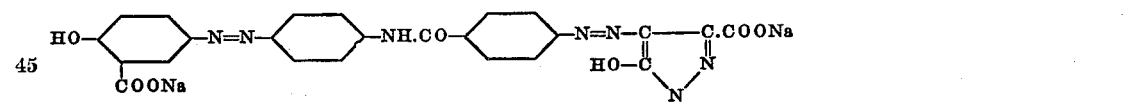

is obtained which dyes cotton—after diazotization and developing with β-naphthol—essentially yellower shades than the dyestuff which has not been condensed.

*Example 9*

On replacing the m-nitrobenzoyl chloride in Example 1 by 2.4-dinitrobenzoyl chloride and treating the condensation product with 42 parts of crystallized sodium sulfide until one nitro group is reduced to the amino group a dyestuff

is obtained which dyes cotton after diazotization and developing with β-naphthol, distinctly yellower shades than the dyestuff which has not been condensed.

*Example 10*

On replacing the m-nitrobenzoyl chloride in Example 1 by 4-nitrotoluene-2-sulfo chloride, and treating the condensation product with 42 parts of crystallized sodium sulfide until the nitro group is reduced to the amino group, a dyestuff of the formula:

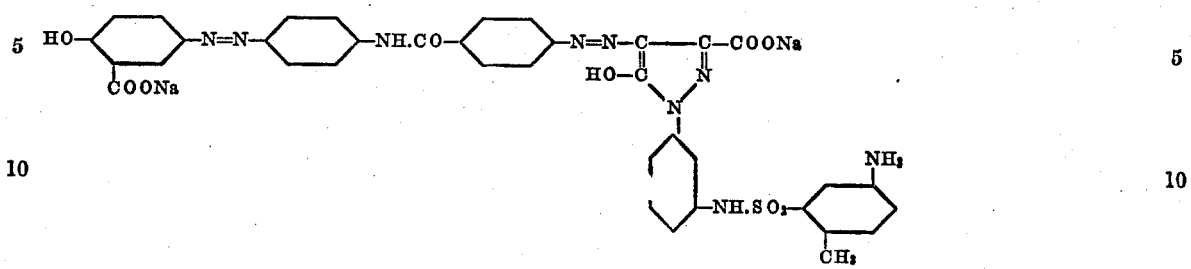

is obtained which dyes the fiber after diazotization and developing with β-naphthol, distinctly yellower shades than the dyestuff which has not been condensed.

*Example 11*

If the condensation of the dyestuff mentioned in Example 1 is carried out with 3-nitrobenzophenone-4'-carboxylic acid chloride, the reduced dyestuff of the formula:

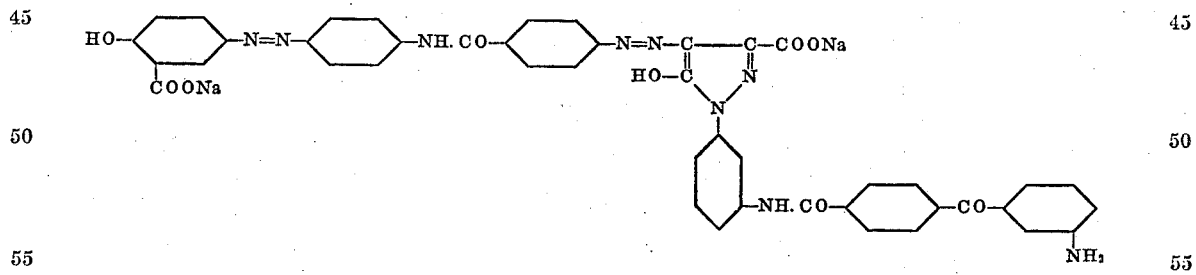

yields distinctly yellower shades after developing with β-naphthol than the dyestuff which has not been condensed.

*Example 12*

The diazo compound prepared from 65 parts of the dyestuff:

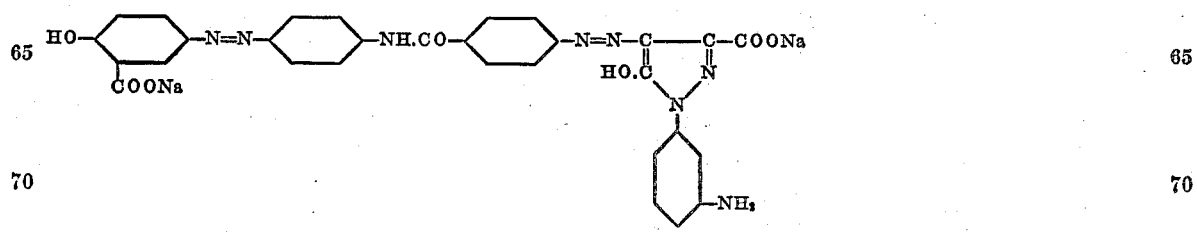

is coupled with 19 parts of p-aminophenyl-3-methyl-5-pyrazolone and the trisazodyestuff thus obtained treated with m-nitrobenzoyl chloride until the amino group can no longer be detected by diazotization. After reduction with 42 parts of crystallized sodium sulfide a dyestuff of the formula:

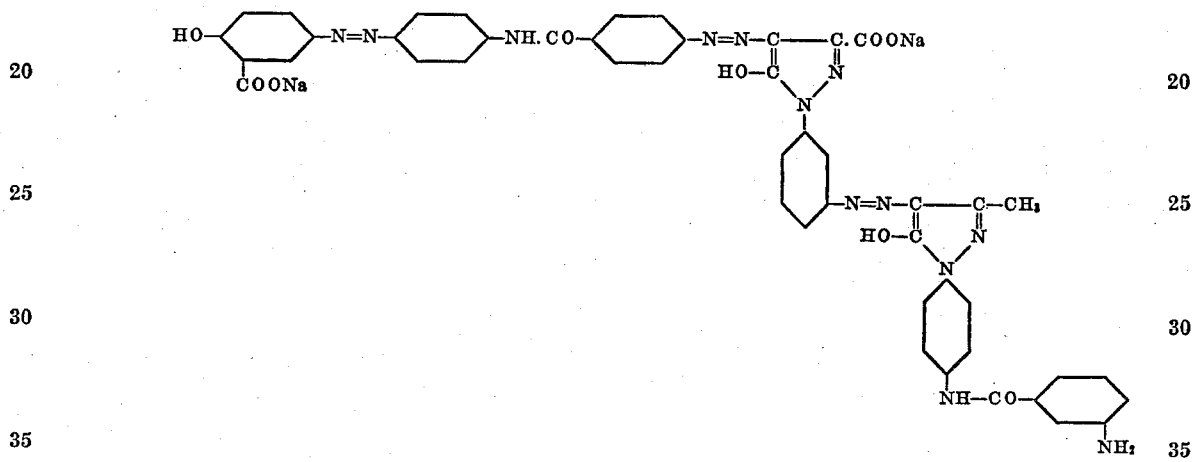

is obtained which, after diazotization and developing with β-naphthol, dyes cotton essentially yellower shades than the dyestuff which has not been condensed.

*Example 13*

184 parts of benzidine are tetrazotized and coupled, first with 140 parts of salicylic acid and then with 283 parts of 1-(2'-methyl-3'-amino-5'-sulfo)-phenyl-3-methyl-5-pyrazolone. The dyestuff is treated with m-nitrobenzoyl chloride until the amino group can no longer be detected by diazotization. After reduction with 420 parts of crystallized sodium sulfide a dyestuff of the formula:

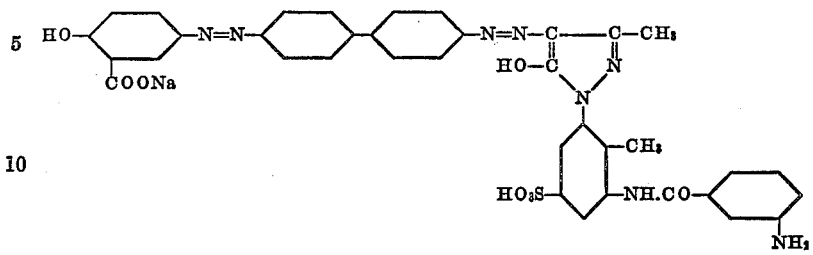

is obtained, which, after diazotization and developing with β-naphthol, dyes cotton essentially yellower shades than the dyestuff which has not been condensed.

Example 14

219 parts of 1-(3'-aminophenyl)-5-pyrazolone-3-carboxylic acid are dissolved in 800 parts of pyridine and to this solution 555 parts of the acid chloride of 4-carboxy-2-nitrophenyl-ethylsulfone are added in small amounts. The reaction mixture is allowed to stand for some time and then the cooled solid reaction product is stirred into water and the separated condensation product is isolated.

46 parts of the condensation product thus obtained are dissolved in water, mixed with 30 parts of caustic soda lye and combined with the diazo compound from 65 parts of the dyestuff:

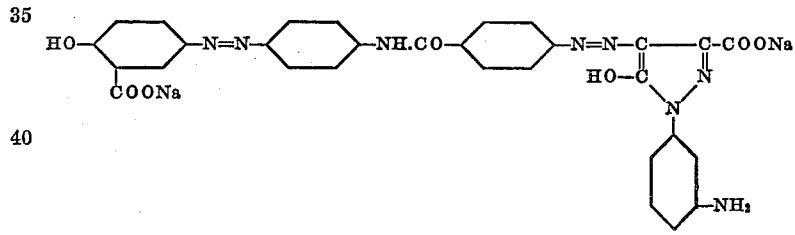

obtainable according to British Patent No. 451,100. After coupling is complete the dyestuff is heated to 80° and reduced in water with 42 parts of crystallized sodium sulfide. After the reduction is terminated the dyestuff of the formula:

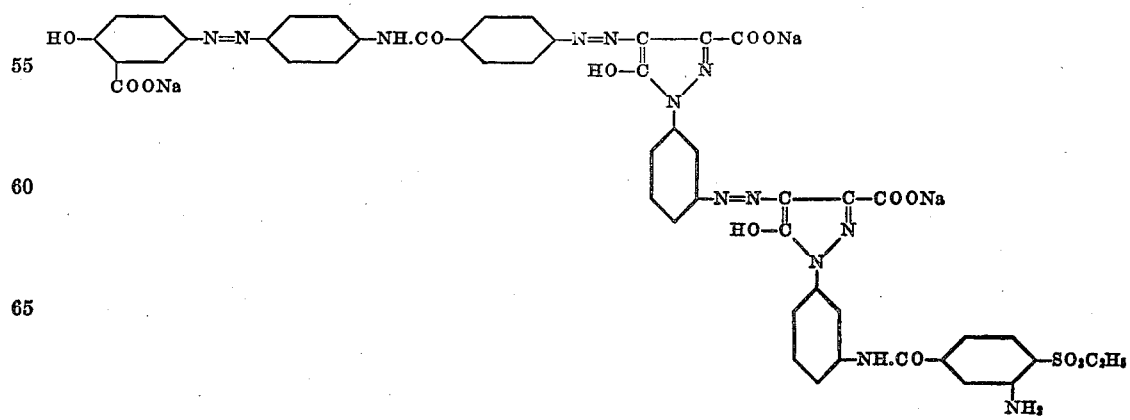

is salted, pressed and dried. After diazotization and developing with β-naphthol it dyes cotton yellow shades, similar to that obtained according to Example 5, while the corresponding dyestuff which contains as final component non-condensed aminophenylpyrazolone-carboxylic acid, yields an orange shade.

We claim:
1. Diazotizable azo dyestuffs of the general formula:

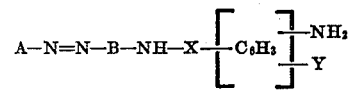

wherein A—N=N— stands for the radical of a diazo compound suitable for the formation of yellow azo dyestuffs, B for a radical selected from the group consisting of 1-phenyl-3-alkyl-5-pyrazolone, 1 - phenyl-5-pyrazolone - 3 - carboxylic acid, alkyl esters and amides of 1-phenyl-5-pyrazolone-3-carboxylic acid and the substitution products thereof substituted in the phenyl radical by a member of the group consisting of alkyl, halogen, the carboxyl and the sulphonic acid radicals, the —NH— group being attached to the phenyl radical, X stands for a radical selected from the group consisting of —CO— and —SO₂—, and Y for a member selected from the group consisting of hydrogen, NO₂, halogen, —C≡N, —CO— and —SO₂— the free valences of the CO and SO₂ groups being connected to an organic radical.

2. Diazotizable azo dyestuffs of the general formula:

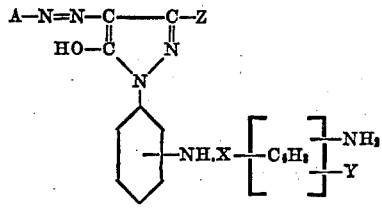

wherein A—N=N— stands for the radical of a diazo compound, suitable for the formation of yellow azo dyestuffs, X stands for a radical selected from the group consisting of —CO— and —SO$_2$—, Y stands for a member selected from the group consisting of hydrogen, NO$_2$, halogen, —C≡N, —CO— and —SO$_2$— the free valences of the CO and SO$_2$ groups being connected to an organic radical, and Z for a member of the group consisting of alkyl, the carboxyl group and carboxylic acid derivatives.

3. Diazotizable azo dyestuffs of the general formula:

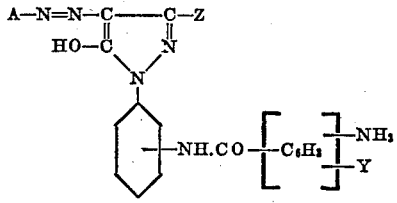

wherein A—N=N— stands for the radical of a diazo compound suitable for the formation of yellow azo dyestuffs, Y stands for a member selected from the group consisting of hydrogen, NO$_2$, halogen, —C≡N, —CO— and —SO$_2$— the free valences of the CO and SO$_2$ groups being connected to an organic radical, and Z for a member of the group consisting of alkyl, the carboxyl group and carboxylic acid derivatives.

4. Diazotizable azo dyestuffs of the general formula:

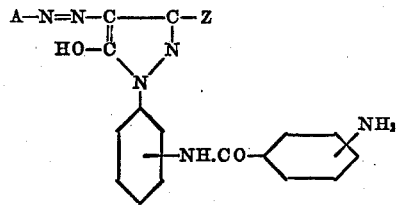

wherein A—N=N— stands for the radical of a diazo compound suitable for the formation of yellow azo dyestuffs and Z for a member of the group consisting of alkyl, the carboxyl group and carboxylic acid derivatives.

5. Diazotizable azo dyestuffs of the general formula:

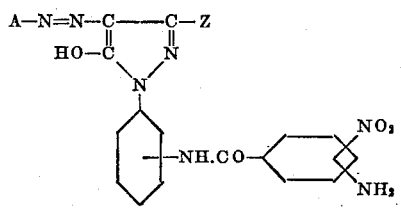

wherein A—N=N— stands for the radical of a diazo compound suitable for the formation of yellow azo dyestuffs and Z for a member of the group consisting of alkyl, the carboxyl group and carboxylic acid derivatives.

6. Diazotizable azo dyestuffs of the general formula:

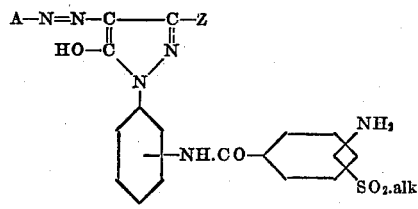

wherein A—N=N— stands for the radical of a diazo compound suitable for the formation of yellow azo dyestuffs and Z for a member of the group consisting of alkyl, the carboxyl group and carboxylic acid derivatives.

7. The diazotizable azo dyestuff which corresponds in its free state to the following formula:

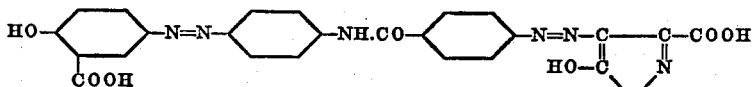

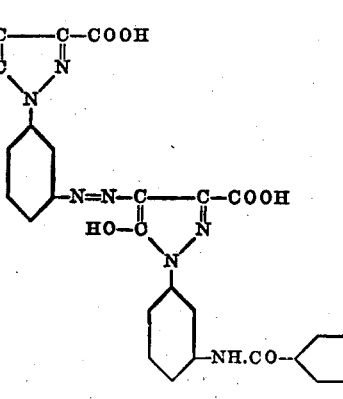

8. The diazotizable azo dyestuff which corresponds in its free state to the following formula:

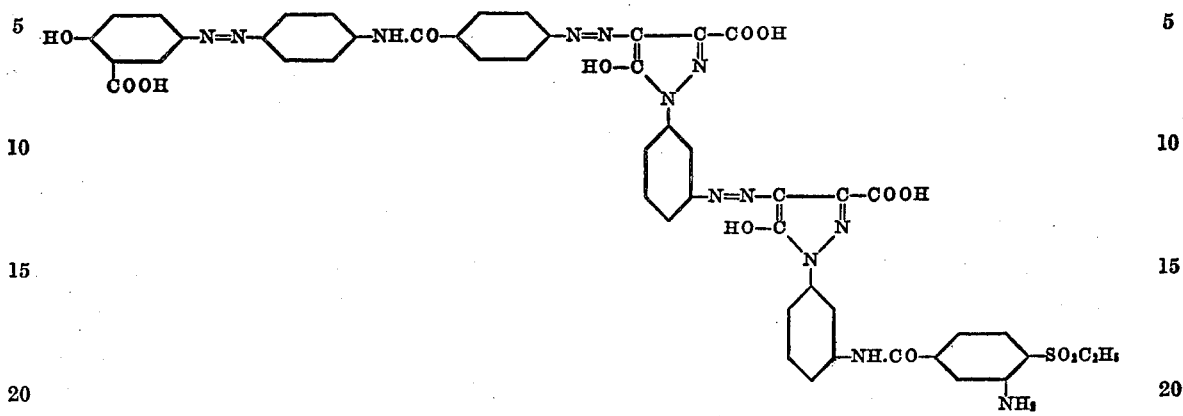

9. The diazotizable azo dyestuff which corresponds in its free state to the following formula:

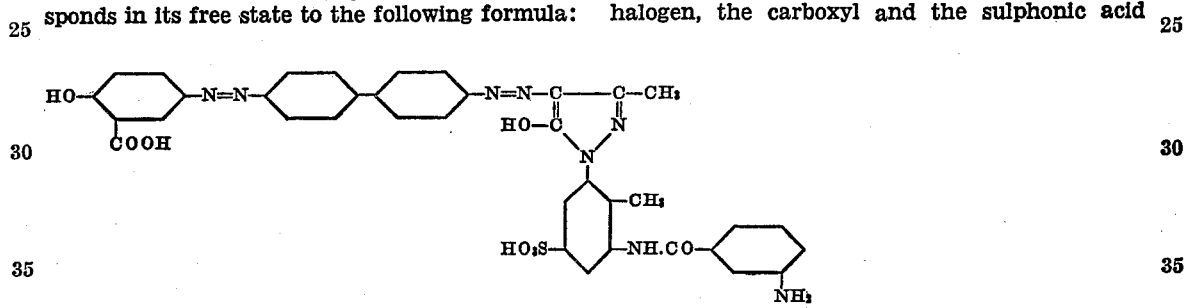

10. The process which comprises applying to cellulosic fibers a diazotizable dyestuff of the general formula:

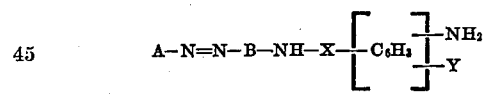

wherein A—N=N— stands for the radical of a diazo compound suitable for the formation of yellow azo dyestuffs, B for a radical selected from the group consisting of 1-phenyl-3-alkyl-5-pyrazolone, 1-phenyl-5-pyrazolone-3-carboxylic acid, alkyl esters- and amides of 1-phenyl-5-pyrazolone-3-carboxylic acid, and the substitution products thereof substituted in the phenyl radical by a member of the group consisting of alkyl, halogen, the carboxyl and the sulphonic acid radicals the —NH— group being attached to the phenyl radical, X stands for a radical selected from the group consisting of —CO— and —SO₂—, and Y for a member selected from the group consisting of hydrogen, NO₂, halogen, —C≡N, —CO— and —SO₂— the free valences of the CO and SO₂ groups being connected to an organic radical, diazotizing and coupling with β-naphthol.

11. The process which comprises applying to cellulosic fibers a diazotizable dyestuff which corresponds in its free state to the following formula:

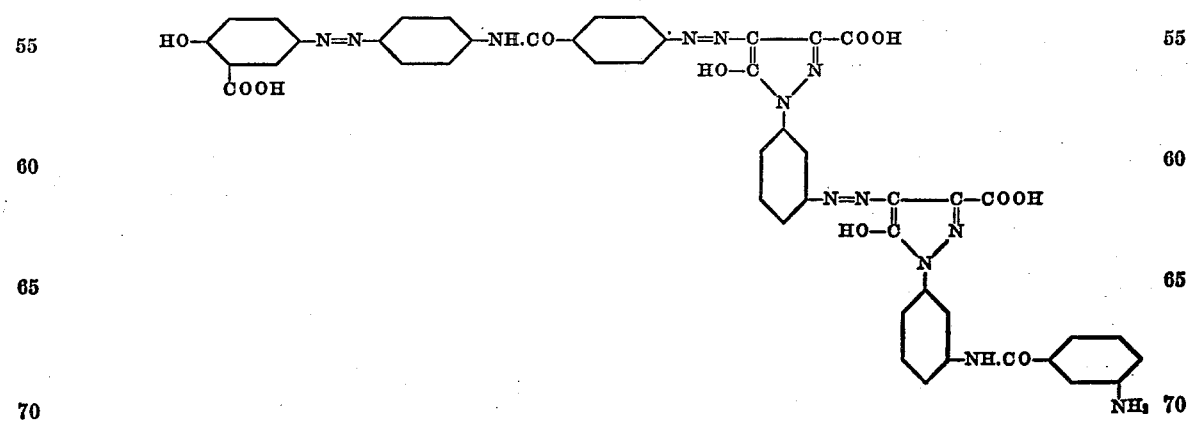

diazotizing and coupling with β-naphthol.

12. The process which comprises applying to cellulosic fibers a diazotizable dyestuff which corresponds in its free state to the following formula:
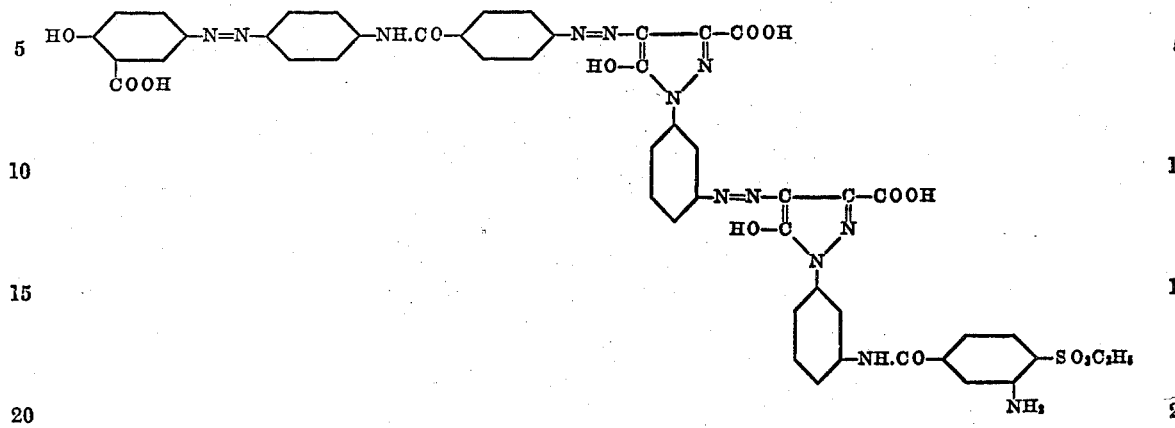
diazotizing and coupling with β-naphthol.
13. Cellulosic fibers dyed according to a process as claimed in claim 10.
14. Cellulosic fibers dyed according to a process as claimed in claim 11.
15. Cellulosic fibers dyed according to a process as claimed in claim 12.
FRITZ SUCKFÜLL.
HEINRICH CLINGESTEIN.